Patented Feb. 22, 1927.

1,618,414

UNITED STATES PATENT OFFICE.

GEORGE HOLLAND ELLIS, OF SPONDON, NEAR DERBY, ENGLAND, ASSIGNOR TO AMERICAN CELLULOSE AND CHEMICAL MANUFACTURING COMPANY LIMITED, A CORPORATION OF DELAWARE.

DYEING OR COLORING OF PRODUCTS MADE WITH CELLULOSE ACETATE.

No Drawing. Application filed September 25, 1923, Serial No. 664,781, and in Great Britain January 27, 1923.

In the specification of my application for United States Patent S. No. 664,780 filed Sept. 25, 1923, there is described a process for dyeing, coloring, printing or stencilling yarns, threads, filaments, fabrics, films or other materials consisting of cellulose acetate alone or associated with other fibres or materials.

In the specification of my said application for United States patent I have proposed to apply for the dyeing, printing or stencilling of such goods or materials any organic compounds or coloring matters which are favourably constituted or have an affinity for cellulose acetate or are capable of dyeing or coloring the same, but which are insoluble, practically insoluble or of relatively low solubility in water, all of which are hereinafter included in the expression relatively water-insoluble organic compounds capable of coloring cellulose acetate, by employing them in the form of solubilized, i. e. soluble or more soluble modifications obtained by pretreating them with one or more bodies having oily or fatty characteristics containing salt-forming groups capable of forming soluble salts with alkalies or ammonia, for example the sulpho group or the carboxyl group or both sulpho and carboxyl groups, or salts of such bodies such for instance as their sodium or other alkali salts or ammonium salts. For simplicity I include such bodies and their salts in the term body of oily or fatty characteristics. In particular according to my said application for U. S. patent one can employ solubilized modifications obtained by treating the said organic compounds or coloring matters with sulphoricinoleic or other sulphonated fatty acids or salts thereof such as the alkali or ammonium salts.

Other bodies of oily or fatty characteristics instanced in my said U. S. application are for example oleic, stearic or palmitic acid and salts thereof such as the alkali and ammonium salts.

The specification of my said U. S. application Serial No. 664,780 gives many examples of classes of organic compounds or coloring matters insoluble or of relatively low solubility in water which may be applied in solubilized modifications as referred to. Amongst these are indicated unsulphonated or other insoluble or relatively insoluble compounds or coloring matters of the "azo" class (monoazo, disazo, trisazo, tetrakisazo and others) which may or may not contain primary or secondary or tertiary amino groups such as alkylated or arylated amido groups or substituent groups such as nitro, chlor, ethoxy or methoxy groups; unreduced coloring matters of the substituted quinone monoimide series generally comprised within the term indophenols: coloring matters or compounds of the following classes, usually containing no sulpho groups:—diphenylmethane, triphenylmethane, triarylmethane, oxazine, azine, diazine, thiazine, unreduced indigoid; basic derivatives of the anthraquinone series; or (for employment according to the azoic or development method) simple amino bases such for example as paranitraniline, metanitraniline, benzidine, dianisidine, dimethylaniline, alpha naphthylamine and diphenylamine.

It is further stated in my said U. S. specification that in cases where the compounds or coloring matters applied in solubilized modifications as referred to contain free primary amino groups and are diazotizable, they may be diazotized and developed on the material in the customary manner to form further dyestuffs.

It is further stated in my said U. S. specification that the solubilized modifications of the organic compounds or coloring matters or of the simple amino bases may be employed for the dyeing of "mixed" materials containing cellulose acetate associated with cotton, silk, wool or other threads or fibres. Especially it is stated that the solubilized modifications of favorably constituted organic compounds or coloring matters of the azo class may be applied to the dyeing of goods consisting of cellulose acetate and one or more of the fibres; cotton, wool, silk, artificial silks of the cellulose type, having no affinity or less affinity than the cellulose acetate for said solubilized compounds or coloring matters, so that the cellulose acetate is selectively or preferentially colored thereby, the other fibre, or one or more of the other fibres, being dyed or colored to similar or differential shades relatively to the cellulose acetate by other coloring matters or compounds or the employment of such other coloring matters or compounds being omitted. Also it is stated in my said U. S. specification that the solubilized modifications of the simple amino bases referred to for application by the azoic method may be similarly applied for the dyeing of such "mixed" goods.

It is further stated in my said U. S. specification that in dyeing materials consisting of or containing cellulose acetate with the solubilized modifications of any of the insoluble or relatively low soluble organic compounds or coloring matters having an affinity for cellulose aceate, other dyes may or may not be employed in combination or association with them in the same operation, or in separate operations, for the production of compound shades on the cellulose acetate.

For further particulars and examples of organic compounds or coloring matters insoluble or of relatively low solubility in water, which may be applied in solubilized modifications as aforesaid for dyeing goods consisting of or containing cellulose acetate, and as to the manner in which they may be applied, I refer to my said U. S. specification Serial No. 664,780.

Now the present invention likewise concerns the dyeing of goods such as referred to consisting of or containing cellulose acetate with the aid of solubilized i. e. soluble or more soluble modifications of organic compounds or coloring matters having an affinity for or capable of coloring cellulose acetate but insoluble, practically insoluble or of relatively low solubility in water, all of which organic compounds or coloring matters are herein included in the expression relatively water-insoluble organic compounds capable of coloring cellulose acetate.

The solubilized modifications employed according to the present invention are prepared with the aid of other solubilizing agents hereinafter specified. Such solubilized modifications may be employed for any of the purposes referred to in my said specification Serial No. 664,780 and any of the water insoluble or relatively low soluble organic compounds or coloring matters or simple amino bases (the latter for application by the azoic method or development) referred to in my said specification may be employed thus solubilized.

As above mentioned I include all such water insoluble or relatively low soluble organic compounds and coloring matters and simple amino bases in the expression relatively water insoluble organic compounds capable of coloring cellulose acetate. In reference to the dyeing with the simple amino bases by the azoic or development method, that is to say wherein the actual dyestuff is produced on the cellulose acetate fibre or material by the development method of formation with the aid of said bases and azoic development, it is understood that the expression "organic compounds capable of coloring cellulose acetate" employed in the present description and claims applies to said simple amino bases in the sense that they are capable of coloring the cellulose acetate by such production of a dye thereon, whether or not the simple amino bases themselves color cellulose acetate.

I have found that in any of the cases referred to in the specification of my said application for U. S. Patent 664,780, one may employ wholly or partly instead of the solubilizing agents therein referred to, other organic bodies as solubilizing agents for the organic compounds or coloring matters or simple amino bases to be applied to the materials consisting of or containing cellulose acetate.

Such other organic solubilizing agents comprise a wide range of non-oleaginous compounds, being organic derivatives containing in their structure one or more salt forming groups such as the sulphonic, carboxyl, or hydroxyl groups, (whether the compound contains only one kind of these groups or different kinds of these groups at the same time) and salts of such bodies; for example one may employ phenols, sulphonic acids, carboxylic acids, phenol-sulphonic acids or other derivatives of the benzene, naphthalene or anthracene series, containing one or more of any of these groups; or derivatives of other cyclic hydrocarbons, saturated or non-saturated, containing one or more of the above mentioned groups, such for example as the naphthenic acids, naphthene sulphonic acids or other carboxylic or sulphonic acids of the cyclo paraffins or one may employ the sodium or other salts of one or more of any of the above mentioned derivatives. All such organic salt-forming derivatives as aforesaid and their salts are hereinafter included in the expression carbocyclic solubilizing agent.

The soluble modifications may be made by merely grinding or mixing the solubilizing body or mixtures of solubilizing bodies, with the suitable coloring matter, organic compound or simple amino base, etc., or by heating under ordinary atmospheric pressure or under increased or reduced pressure in the presence or absence of water. The soluble modifications of the suitable coloring matter or compound or simple amino base or mixtures of same may then be utilized for any of the purposes described in the specification of my said application for U. S. patent Serial No. 664,780 for example:—

For the dyeing of acetyl cellulose, by simply dissolving the soluble modification in hot or cold water, filtering into the dyebath (which may be acid, neutral or alkaline) and conducting the dyeing as usual;

For printing or stencilling acetyl cellulose, by thickening, as may be required, a solution of the soluble modification, or mixture of such, by the use of substances such as starches, gums, flour and the like, and applying in the usual manner, followed by such after-treatment as may be requisite;

For the printing or dyeing of acetyl cellulose by the "azoic" process, involving diazotization and development upon or in the acetyl cellulose material, where the compounds or coloring matters, or mixtures of such, applied in the form of their soluble modifications, are primary amines capable of such treatment;

For the dyeing or printing of mixed goods containing acetyl cellulose, either in uniform shades or in contrasting colours or leaving the material other than the acetyl cellulose uncolored.

It is further understood that mixtures containing different carbocyclic solubilizing agents of the present application for patent may be employed, or mixtures of one or more of them with one or more of the solubilizing agents of my said application for U. S. Patent S. No. 664,780, and that the expression "a medium comprising a carbocyclic solubilizing agent" in the claims is to be read as including any such mixtures as well as the individual carbocyclic solubilizing agents themselves.

The term dyeing in the claims includes dyeing, printing and stencilling.

The term "body of naphthenic acid class" in the claims hereto comprises the napthenic acids and naphthene sulphonic acids, and their sodium or other salts.

What I claim and desire to secure by Letters Patent is:—

1. In and for the dyeing of yarns, fabrics and other products comprising cellulose acetate, the employment of relatively water-insoluble organic compounds capable of coloring cellulose acetate, said organic compounds being employed in the form of solubilized modifications obtained by pretreating them with a medium comprising a carbocyclic solubilizing agent.

2. In and for the dyeing of yarns, fabrics and other products comprising cellulose acetate, the employment of relatively water-insoluble organic compounds capable of coloring cellulose acetate, said organic compounds being employed in the form of solubilized modifications obtained by pretreating them with a medium comprising a carbocyclic solubilizing agent which is a derivative of the naphthenic acid class.

3. In and for the dyeing of yarns, fabrics and other products comprising cellulose acetate, the employment of relatively water-insoluble organic compounds capable of coloring cellulose acetate, said organic compounds being employed in the form of solubilized modifications obtained by pretreating them with a medium comprising a carbocyclic solubilizing agent which is a naphthenic acid salt.

4. In and for the dyeing of yarns, fabrics and other products comprising cellulose acetate, the employment of relatively water-insoluble organic compounds capable of coloring cellulose acetate, said organic compounds being employed in the form of solubilized modifications obtained by pretreating them with a medium comprising a naphthenic acid sodium salt.

5. In and for the dyeing of yarns, fabrics and other products comprising cellulose acetate, the employment of relatively water-insoluble organic compounds, capable of coloring cellulose acetate, said organic compounds being employed in the form of solubilized modifications obtained by pretreating them with a mixture comprising a carbocyclic solubilizing agent and a body of oily or fatty characteristics.

6. In and for the dyeing of yarns, fabrics and other products comprising cellulose acetate, the employment of relatively water-insoluble organic compounds, capable of coloring cellulose acetate, said organic compounds being employed in the form of solubilized modifications obtained by pretreating them with a mixture comprising a carbocyclic solubilizing agent which is a derivative of the naphthenic acid class and a higher fatty acid compound.

7. In and for the dyeing of yarns, fabrics and other products comprising cellulose acetate, the employment of relatively water-insoluble organic compounds capable of coloring cellulose acetate, said organic compounds being employed in the form of solubilized modifications obtained by pretreating them with a mixture comprising a carbocyclic solubilizing agent which is a derivative of the naphthenic acid class and a sulphonated ricinoleic acid body.

8. In and for the dyeing of yarns, fabrics and other products comprising cellulose acetate, the employment of relatively water-insoluble organic compounds capable of coloring cellulose acetate, said organic compounds being employed in the form of solubilized modifications obtained by pretreating them with a mixture comprising a carbocyclic solubilizing agent which is a naphthenic acid salt and sodium salt of sulphoricinoleic acid.

9. In and for the dyeing of yarns, fabrics and other products comprising cellulose acetate, the employment of relatively water-insoluble organic compounds of the azo class capable of coloring cellulose acetate, said organic compounds of the azo class being employed in the form of solubilized modifications obtained by pretreating them with a medium comprising a carbocyclic solubilizing agent.

10. In and for the dyeing of yarns, fabrics and other products comprising cellulose acetate, the employment of relatively water-insoluble organic compounds of the azo class capable of coloring cellulose acetate, said organic compounds of the azo class being employed in the form of solubilized modifications obtained by pretreating them with a medium comprising a carbocyclic solubilizing agent which is a derivative of the naphthenic acid class.

11. In and for the dyeing of yarns, fabrics, and other products comprising cellulose acetate, the employment of relatively water-insoluble organic compounds of the azo class capable of coloring cellulose acetate, said organic compounds of the azo class being employed in the form of solubilized modifications obtained by pretreating them with a medium comprising a carbocyclic solubilizing agent which is a naphthenic acid salt.

12. In and for the dyeing of yarns, fabrics and other products comprising cellulose acetate, the employment of relatively water-insoluble organic compounds of the azo class capable of coloring cellulose acetate, said organic compounds of the azo class being employed in the form of solubilized modifications obtained by pretreating them with a medium comprising a naphthenic acid sodium salt.

13. In and for the dyeing of yarns, fabrics and other products comprising cellulose acetate, the employment of relatively water-insoluble organic compounds of the azo class capable of coloring cellulose acetate, said organic compounds being employed in the form of solubilized modifications obtained by pretreating them with a mixture comprising a carbocyclic solubilizing agent and a body of oily or fatty characteristics.

14. In and for the dyeing of yarns, fabrics and other products comprising cellulose acetate, the employment of relatively water-insoluble organic compounds of the azo class capable of coloring cellulose acetate, said organic compounds of the azo class being employed in the form of solubilized modifications obtained by pretreating them with a mixture comprising a carbocyclic solubilizing agent which is a derivative of the naphthenic acid class and a higher fatty acid compound.

15. In and for the dyeing of yarns, fabrics and other products comprising cellulose acetate, the employment of relatively water-insoluble organic compounds of the azo class capable of coloring cellulose acetate, said organic compounds of the azo class being employed in the form of solubilized modifications obtained by pretreating them with a mixture comprising a carbocyclic solubilizing agent which is a derivative of the naphthenic acid class and a sulphonated ricinoleic acid body.

16. In and for the dyeing of yarns, fabrics and other products comprising cellulose acetate, the employment of relatively water-insoluble organic compounds of the azo class capable of coloring cellulose acetate, said organic compounds of the azo class being employed in the form of solubilized modifications obtained by pretreating them with a mixture comprising a carbocyclic solubilizing agent which is a naphthenic acid salt and sodium salt of sulphoricinoleic acid.

In testimony whereof I have hereunto subscribed my name.

GEORGE HOLLAND ELLIS.